United States Patent [19]

Haslett

[11] 4,253,708
[45] Mar. 3, 1981

[54] SLACK CONTROL FOR CRAWLER TYPE TRACK ASSEMBLIES

[75] Inventor: Glenn M. Haslett, Peoria, Ill.

[73] Assignee: Caterpillar Tractor Co., Peoria, Ill.

[21] Appl. No.: 85,642

[22] PCT Filed: Apr. 20, 1979

[86] PCT No.: PCT/US79/00253

§ 371 Date: Apr. 20, 1979

§ 102(e) Date: Apr. 20, 1979

[87] PCT Pub. No.: WO80/02269

PCT Pub. Date: Oct. 30, 1980

[51] Int. Cl.³ .............................................. B62D 55/20
[52] U.S. Cl. ........................................ 305/47; 305/25; 305/35 R
[58] Field of Search .................................. 305/25–26, 305/33, 35 EB, 35 R, 38, 40–41, 43, 47–49; 74/242.5, 245 LP, 247; 180/9.2 R

[56] References Cited

U.S. PATENT DOCUMENTS

| 1,773,777 | 8/1930 | De Rocher | 305/49 |
| 1,975,726 | 10/1934 | Martinale | 305/47 X |
| 2,416,679 | 3/1947 | Curtis | 305/33 X |
| 2,462,643 | 2/1949 | Johnson et al. | 305/47 X |
| 3,734,577 | 5/1973 | Snellman | 305/49 X |
| 4,124,255 | 11/1978 | Kohriyama | 305/41 |

*Primary Examiner*—Charles A. Marmor
*Attorney, Agent, or Firm*—Wegner, Stellman, McCord, Wiles & Wood

[57] ABSTRACT

A crawler type vehicle including a main frame (10), a track frame (14), a continuous track (24) having upper and lower runs composed of plural rigid track links (26) mounting track shoes (28) and pivotally interconnected by pins (30) and bushings (42), an idler sprocket (16) on the track frame and a drive sprocket (20) engaging some of the bushings. The invention contemplates the improvement of a flexible belt (46) unattached to but supporting the upper run of the track assembly.

6 Claims, 2 Drawing Figures

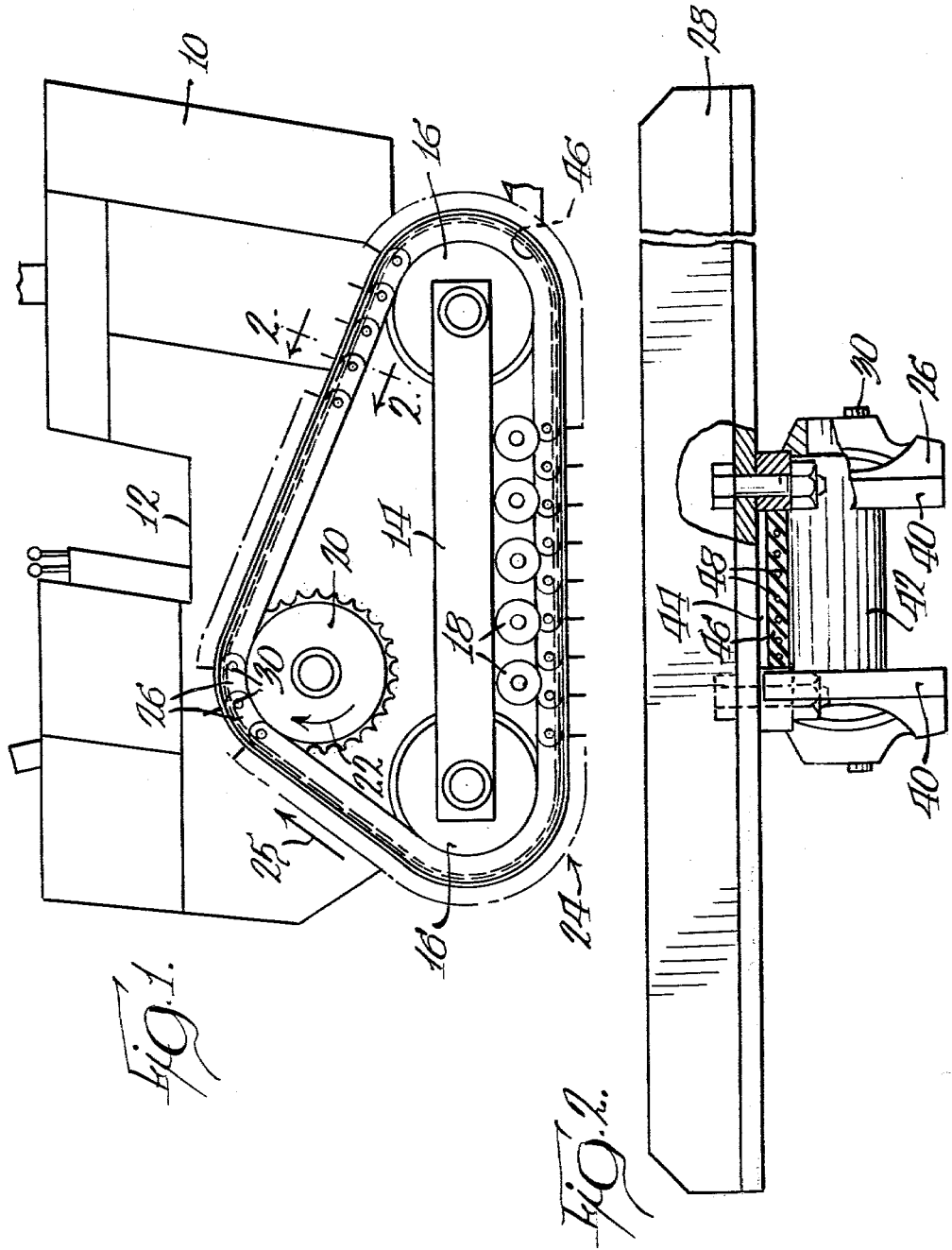

SLACK CONTROL FOR CRAWLER TYPE TRACK ASSEMBLIES

TECHNICAL FIELD

This invention relates to slack control in continuous track assemblies of the type used with crawler type vehicles to avoid scoring of track pins.

BACKGROUND ART

Prior art of possible relevance includes U.S. Pat. Nos. 1,146,537 issued July 13, 1915 to Tolles; 1,512,152 issued Oct. 21, 1924 to White; 2,453,209 issued Nov. 9, 1948 to Dwight; and 2,702,213 issued Feb. 15, 1955 to Lund.

Tolles discloses a crawler type track assembly utilizing a plurality of track shoes which in turn are mounted on a pair of flexible, endless belts. The belts serve as the means to interconnect the individual shoes to define a continuous assembly.

White discloses a continuous track assembly formed of a plurality of pivotally interconnected links. A roller chain is used to minimize friction between the lower run of the belt and the track frame of the vehicle but otherwise serves no other function.

Dwight provides a continuous track assembly wherein individual track shoes are interconnected by flexible belts in a manner not totally unlike that of Tolles. The flexible belts are elastomeric and reinforced by cable or the like. In addition, Dwight provides two further belts which are not at all attached to the track assembly but which frictionally engage the same along with a drive sprocket to drive the continuous track assembly.

Lund discloses a track assembly including endless bands secured to the individual track shoes in the assembly. Of principal concern to Lund is the provision of a joint which may be utilized to repair the assembly when one of the flexible bands breaks.

None of the foregoing prior art patents consider the problem of slack control in a continuous track assembly. Slack must be provided to allow for the absorption of bumps in uneven ground over which such vehicles typically operate. Slack also is utilized to reduce the magnitude of tension between the drive sprocket and the idler sprocket on the upper run of the belt (hereinafter "slack side tension").

If too much slack is provided, the drive sprocket will jump from one bushing to the next and a positive drive will not be provided. Moreover, scoring of the pins used to interconnect the links is caused by high unit loads where the pins and bushings contact each other. This problem is aggrevated when slack side tension is high.

DISCLOSURE OF THE INVENTION

According to the invention, slack side tension is reduced through the use of a support for the upper run of the continuous track assembly. The support is unattached to the assembly.

Other objects and advantages will become apparent from the following specification taken in connection with the accompanying drawings.

BRIEF DESCRIPTION OF THE DRAWINGS

FIG. 1 is a somewhat schematic, side elevation of a crawler type vehicle embodying the invention;

FIG. 2 is an enlarged, fragmentary sectional view taken approximately along the line 2—2 in FIG. 1.

BEST MODE FOR CARRYING OUT THE INVENTION

With reference to FIG. 1, there is seen a vehicle including a main frame 10 which, as is well known, will typically house a source of motive power and is provided with an operator area 12.

Flanking the main frame 10 on apposite sides thereof are a pair of track frames 14 (only one of which is shown). As seen in FIG. 1, the track frame 14 mounts, both fore and aft idlers 16 along with a plurality of conventional track roller assemblies 18. Extending from the side of the main frame 10 is a drive sprocket 20 driven by the engine via a suitable transmission. However, it is to be understood that the invention contemplates that the drive sprocket 20 could be mounted on the track frame 14 as, for example, in lieu of the rearwardmost idler 16.

In the usual case, in order to propel the vehicle forwardly, the drive sprocket 20 will be rotating in a clockwise direction as viewed in FIG. 1, that is, in the direction of an arrow 22. Movement of a track assembly, generally designated 24, will therefore be in the direction of an arrow 25. As a consequence, that part of the upper run of the track assembly 24 extending from the drive sprocket 20 to the rearwardmost idler 16 will be under considerable tension due to the driving forces iparted thereto. Conversely, that part of the upper run extending from the drive sprocket 20 forwardly to the forwardmost idler will be relatively slack although there will be tension present. The tension thereat will be due to the weight of that part of the track assembly between the drive sprocket 20 and the forwardmost idler 16.

The track assembly 24 is defined by a plurality of rigid links 26 and each will typically mount a track shoe 28 (FIG. 2). As seen in FIG. 1, pins 30 interconnect the various links for relative pivotal motion. As seen in FIG. 2, each of the links 26 has two spaced sides 40 and a bushing 42 extends therebetween and receives a corresponding one of the pins 30. This much of the construction of the track assembly 24 may be conventional. It will be noted from FIG. 2, however, that a space 44 exists between the bushing 42 and the lowermost side of the track shoe 28 secured to the corresponding link 26.

According to the invention, within the space 44 between each bushing 42 and the associated track shoe 28 there is disposed a continuous belt 46. In a preferred embodiment, the belt 46 is formed of an elastomer reinforced with circumferentially running metal cable 48. The belt 46 is therefore captured by the assembly but is not attached thereto. That is, relative circumferential movement of the belt can occur with respect to the track shoe 28.

The belt 46 when installed is made sufficiently taut so as to prevent that part of the upper run of the track assembly 24 extending from the drive sprocket 20 to the forwardmost idler 16 from assuming its ordinary catenary curve which is responsible for generating tension on the so-called "slack side." Because of its being captured, the belt 46 will rotate with the track assembly 24 but the aforementioned allowable relative movement between the track shoe 28 and the belt 46 allows the former to assume any desired configuration dependant upon unevenness in the underlying terrain. Preferably, the belt 46 has a spring rate sufficient to yield to unevenness in the underlying terrain and yet to provide the aforementioned support for the slack side part of the upper run of the assembly 24.

INDUSTRIAL APPLICABILITY

If a given vehicle is required to provide an effective track assembly tension of 80,000 pounds (draw bar pull) and the slack side tension of the track assembly is 10,000 pounds, then the tension between the drive sprocket 20 and the rearmost idler sprocket 16 in the assembly must be 90,000 pounds. Pin and bushing contact therefore is subjected to 90,000 pounds of force although only 80,000 pounds are available to perform useful work. Thus, the pin and bushing contact would be subjected to a 12½% increase in load over what is actually necessary.

Through the use of the belt 46 according to the invention, the slack side tension is considerably reduced to approximately zero. Consequently, to achieve the desired rating in a crawler type vehicle made according to the invention of, for example, 80,000 pounds, only 80,000 pounds of tension need be present between the drive sprocket 20 and the rearmost idler 16. Consequently, pin and bushing loading is reduced thereby substantially increasing the life thereof.

I claim:

1. In a chain drive assembly having a plurality of track links (26) each with a bushing (42), a plurality of pins (30) extending through corresponding bushings to pivotally interconnect said track links to each other to form said assembly, a plurality of track shoes (28) secured to said links in spaced relation to said bushings, the improvement wherein there is provided a flexible belt (46) extending through the spaces (44) between said bushings and corresponding track shoes but unattached to said bushings, track shoes, or links for support of said assembly, said assembly being circumferentially movable relative to said belt.

2. In a chain drive assembly having a plurality of track links (26) each with a bushing (42), a plurality of pins (30) extending through corresponding bushings to pivotally interconnect said track links to each other to form said assembly, and a plurality of track shoes (28) secured to said links, said assembly defining upper and lower runs, the improvement comprising a flexible belt (46) extending through the elements of said assembly and means (28, 42) capturing said belt within said assembly without attaching said belt to said links, bushings or shoes, said assembly being circumferentially movable relative to said belt and said belt engaging said upper run for support thereof to prevent said upper run from sagging and thereby reduce slack side tension in said upper run.

3. The chain drive assembly of claim 2 wherein said belt is a metal reinforced elastomer.

4. In a crawler type vehicle including a main frame (10), a track frame (12) mounted on said main frame, a continuous track (24) having upper and lower runs and composed of plural rigid track links (26) mounting track shoes (28) and pivotally interconnected by pins (30) and bushings (42), an idler sprocket (16) on said track frame engaging some of said bushings and a drive sprocket (20) engaging others of said bushings, the improvement comprising a flexible belt (46) unattached to but extending between the links, shoes and bushings of said upper run, said upper run being circumferentially movable with respect to said belt and supported thereby so that said upper run is prevented from sagging whereby the available draw bar pull of said vehicle is increased.

5. The crawler type vehicle of claim 4 wherein said belt is continuous.

6. The crawler type vehicle of claim 5 wherein said belt has substantially the same peripheral length as said track and is captured between said links and said shoes.

* * * * *